United States Patent

[11] 3,574,973

| [72] | Inventor | Edwin R. Rader |
| | | Tallmadge, Ohio |
| [21] | Appl. No. | 741,934 |
| [22] | Filed | July 2, 1968 |
| [45] | Patented | Apr. 13, 1971 |
| [73] | Assignee | Information Development Corporation |
| | | Akron, Ohio |

[54] TIRE UNIFORMITY CORRECTION MACHINE
8 Claims, 6 Drawing Figs.

[52] U.S. Cl. ................................................ 51/165,
51/106, 51/281, 157/13
[51] Int. Cl. ...................................................... B24b 49/00
[50] Field of Search ........................................... 51/165,
165.03, 33.1, 105, 106, 281, 289, 324, 326, 327;
157/13; 73/146

[56] References Cited
UNITED STATES PATENTS

| 2,079,585 | 5/1937 | Sloman | 73/146 |
| 2,695,520 | 11/1954 | Karsai | 73/146 |
| 2,731,887 | 1/1956 | Sjostrand | 90/11 |
| 2,765,845 | 10/1956 | Bullis | 157/3 |
| 2,766,563 | 10/1956 | Bennett | 51/33X |
| 2,869,362 | 1/1959 | Gough et al. | 73/146 |
| 2,897,882 | 8/1959 | Barrett | 157/13 |
| 2,918,116 | 12/1959 | Mooney | 157/13 |
| 2,920,481 | 1/1960 | Hulswit et al. | 73/146 |
| 2,924,048 | 2/1960 | Sjostrand | 51/165 |
| 2,966,011 | 12/1960 | Peacock | 51/33 |
| 3,060,733 | 10/1962 | Herzegh | 73/146 |
| 3,375,714 | 4/1968 | Bottasso | 73/146 |

*Primary Examiner*—Lester M. Swingle
*Attorney*—Oldham and Oldham

ABSTRACT: Grinder heads are moved into position under control of a closed loop servosystem to follow at a predetermined distance above the surface of the tire periphery. The tire runs against a pilot or road wheel having load cell detections to determine radial force variation in the tire under loaded conditions. Force channels obtaining signals from the load cells provide correction signals to the grinder head servosystem which is updated each tire revolution actuating the grinders to cut small segments from the surface of the tire to cancel out to at least a predetermined minimum the radial force vibrations.

INVENTOR.
EDWIN R. RADER

BY

*Oldham & Oldham*

ATTORNEYS

INVENTOR.
EDWIN R. RADER
BY
Oldham & Oldham
ATTORNEYS

TIRE UNIFORMITY CORRECTION MACHINE

It is well known that major automobile companies and tire companies have been using laboratory-type computers to study the effects of tire uniformity on different kinds of cars traveling at different speeds on different road surfaces, and to determine load-force variations in tire harmonics. In the past several years testing equipment has been installed in factories to inspect and grade tire products. The kind of ride a tire can provide depends to a great extent on the peak-to-peak variations in radial and lateral forces. The radial variation is particularly important, since it causes vertical displacements to the axle each time the tire revolves and the tire, in effect, behaves as if it were eccentrically mounted.

The general object of the present invention is to provide a tire uniformity correction system which grinds rubber from the tire tread to correct for radial force variations in the tire under "on the road" conditions operation.

A further object of the invention is to provide a system for tire uniformity correction which is relatively simple, highly reliable, and very rapid in operation.

A further object of the invention is to provide a computer controlled grinding system associated with rubber tires to provide tire uniformity, particularly of radial force variations so as to make practically all tires manufactured acceptable for actual vehicle usage.

The aforesaid objects of the invention and other objects which will become apparent as the description proceeds are achieved by providing a tire correction system which includes (1) means to rotatably support an inflated tire having a tread, (2) means to radially load the tire tread and rotate the tire, (3) means to detect radial force variation in the tire occurring during the loaded rotation thereof, and determine the point on the tread at which the radial force variations occur, and produce a grind control signal in accordance therewith, (4) grinder means positioned adjacent the tread of the tire, and (5) means to actuate the grinder means to move into the tread to grind portions therefrom as the tire rotates in accordance with the grind signals.

For a better understanding of the invention reference should be had to the accompanying drawings wherein.

Figure 1:
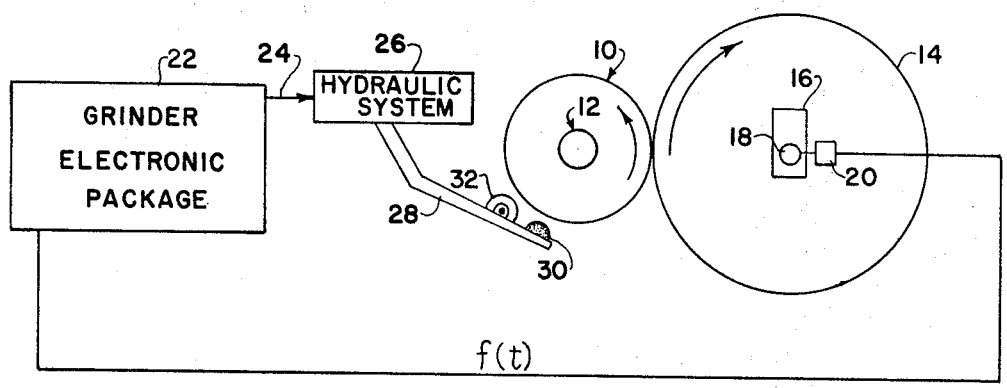
FIG. 1 is a schematic illustration of the tire correction system indicating the major components.

With reference to the embodiment of the invention shown in FIG. 1, the numeral 10 indicates generally a tire which is first centered and rotatably mounted by an appropriate mounting axle 12. The tire may be inflated before or after mounting as is selectively desired. A rotating road wheel 14 is then positioned by mechanism 16 to put a load of some predetermined amount onto the tire, thus flexing it. Radial and lateral forces are sensed at the end of the road wheel shaft 18 by appropriate load cells 20. The load cells can be any type of appropriate strain gauge, or other conventional equipment well known to those skilled in the art. The signal $f(t)$ is sent to a grinder electronics package indicated generally by numeral 22. The package 22 produces a force correction signal sent over line 24 to a hydraulic system indicated by block 26. The hydraulic system drives a support arm 28 which has a grinder wheel 30 and a surface or peripheral detector 32 positioned thereon. The detector 32, through a feedback servo-loop system, more fully described with reference to FIG. 5, automatically positions the grinder 30 at some predetermined distance from the outer periphery of tire 10 so that this distance remains essentially constant regardless of any eccentricity of such tire 10. In any event, in accordance with the signal $f(t)$ correcting grinding signals actuate the hydraulic system 26 to grind portions from the peripheral surface of tire 10, thus correcting the peak-to-peak radial load variations and eliminating rough ride with a pneumatic tire, even though it may be statically and dynamically in balance.

Figure 2:
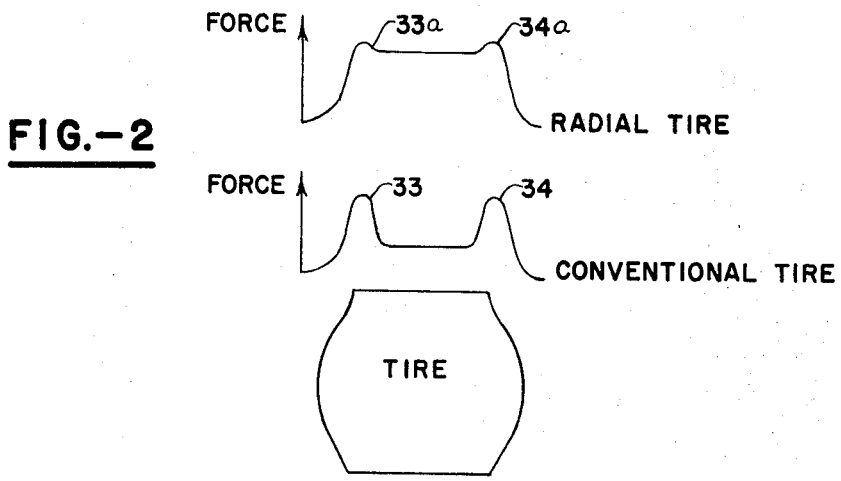
FIG. 2 is a schematic illustration of a tire under loaded conditions illustrating the radial force variations that normally take place.

It has been found that most of the radial load variations occur at the lateral thread portions on the crown of the tire. This is most clearly illustrated in FIG. 2 of the drawings which shows that for conventional tires, load peaks 33 and 34 stand out, while for a radial tire the peaks 33a and 34a are slightly reduced with respect to the overall radial force curve of the tire. Thus, to correct the radial forces most efficiently, grinding must be done on the peripheral edges of the tire, and this mechanically requires a grinder associated with each lateral edge. There is no grinding over the substantial center portion of the tire tread. Hence, the hydraulic system indicated in FIG. 1 of the drawing may actually be duplicated twice for each tire since a separate grinder 30 is associated with each lateral edge of the tire 10. Of course, it should be understood that if the radial force variations will differ from those shown in FIG. 2 of the drawings, the placing of the grinder 30 and the number of systems necessary might appropriately vary. Also, even though a hydraulic system is indicated in FIG. 1 of the drawings, it should be understood that an electrical or other appropriate grinder actuating system might be utilized.

Figure 3:
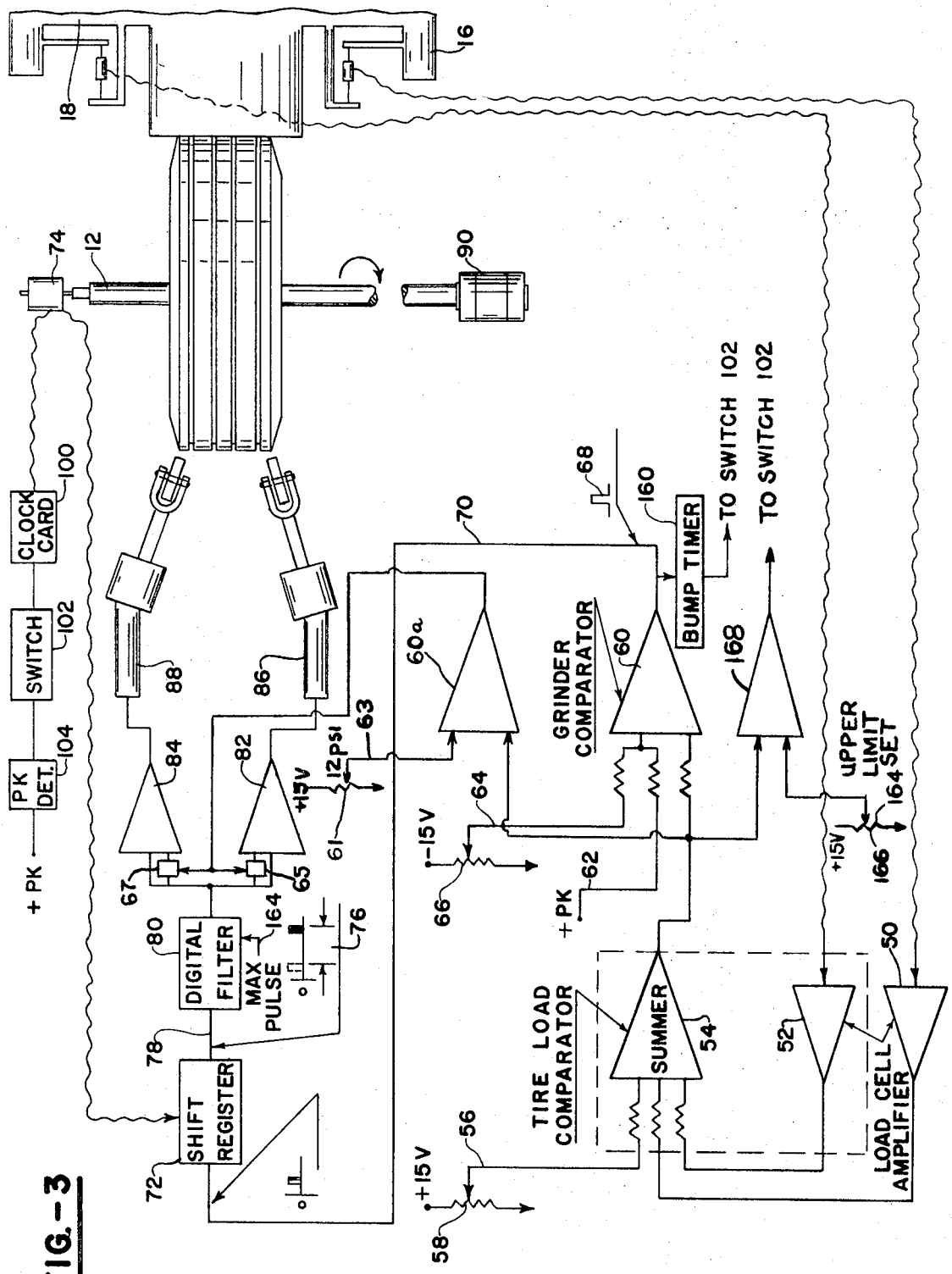
FIG. 3 is a schematic block diagram of the preferred system in much greater detail than FIG. 1.

A complete schematic of the overall system and particularly one showing the grinder electronics package 22 is illustrated in FIG. 3 of the drawings. Essentially, the package incorporates a pair of load cell amplifiers 50 and 52 which receive the signal pulses from load cells 20a and 20b, respectively. The amplifiers couple into a tire load comparator 54 together with a predetermined tire load signal fed through line 56 as picked off an adjustable rheostat 58. The comparator 54 sums the input signals from amplifiers 50 and 52 and from line 56 to produce an output signal $f(t)$ which is an indication of the force variation of the tire in loaded combination with the road wheel. If there is no variation that exceeds the sum of reference plus limit setting, the output $f(t)$ from comparator 54 should be zero. The $f(t)$ signal is sent to a grinder comparator 60 where summation is made with a plus peak signal 62 combined with a lower grind limit signal sent over line 64 as picked off a manually adjustable rheostat 66. The plus peak signal 62 represents the minimum radial force variation as detected by peak detector 104 which will be more fully described hereinafter. The signal out of the grinder comparator 60 is a grind pulse or signal $f_3$, depending on $f(t)$ and passes over line 70 to a shift register 72. The shift register 72 receives a clock pulse for each 1° of tire rotation as provided by a code wheel 74 driven directly with shaft 12. Since it is impossible to grind at the same point that the force variations are detected by the load cells 20a and 20b, the shift register is necessary to shift the actual point of grind around the periphery of the tire to the point at which the grinders are positioned. As indicated in FIG. 1 of the drawings, this point is somewhere between 75° and 135° from the point of radial force detection. The shift register 72 is a conventional item, and merely operates to delay actuation of the grinder heads until the proper time. The code wheel 74 is also a conventional mechanism well known to those skilled in the art, and, for example, might be what is called a "Rotaswitch" as made by Disc Instruments, Inc., 2701 S. Halladay Street, Santa Anna, Calif. 92705.

The delayed output signal indicated generally by numeral 76 is fed from the shift register 72 over line 78 to a digital filter 80 which simply converts the signal to a digital drive to respective servoamplifiers 82 and 84 for drive of respective hydraulic cylinders 86 and 88 to position the grind wheels simultaneously against the lateral shoulder portions of the tire as indicated. Other functions of filter 80 are brought out hereinbelow.

Even though separate load signals are detected by cells 20a and 20b, only a single $f(t)$ force signal is generated so that both hydraulic cylinders act simultaneously upon their drive from the signal received through the digital filter 80. While it would be possible to set up separate electronic systems for each grinder, since, in effect, there might be instances where the radial force variations are different from shoulder to shoulder with reference to an angular position on the tire, it has been found that such expense is not warranted since the radial force variations tend to fall very closely on the same angular relationship to the tire. Besides, the summation of these forces in the tire load comparator 54 compensates for any time delay of angular difference that may occur therebetween so that the signal $f(t)$ is representative of the average between any angular variation in the radial force that might occur. Hence, the system operates just as well, and is considerably less expensive when only a single drive pulse drives both grinder heads.

In order to more accurately simulate the actual conditions under which the tire will be operating, the invention contemplates that the shaft 12 will be driven as by a suitable motor 90 and, for the purposes of the invention, the direction of rotation should be clockwise at 60 r.p.m. so that the peripheral detector 32 engages the periphery of the tire before its respective grinder head.

The heart of the timing and switching of the system is accomplished by a clock card circuit indicated by block 100 which receives one pulse for every 360° rotation from the code wheel 74, or, in other words, one pulse per second at 60 r.p.m. The clock card 100 provides the timing and control to the operation of the overall system since, in effect, it controls the operation of a plurality of switches indicated by block 102. The switches 102 control a peak detection circuit indicated by block 104 to produce the $+pk$ signal 62 which is provided as an input to the grinder comparator 60.

PEAK DETECTION

Figure 6:
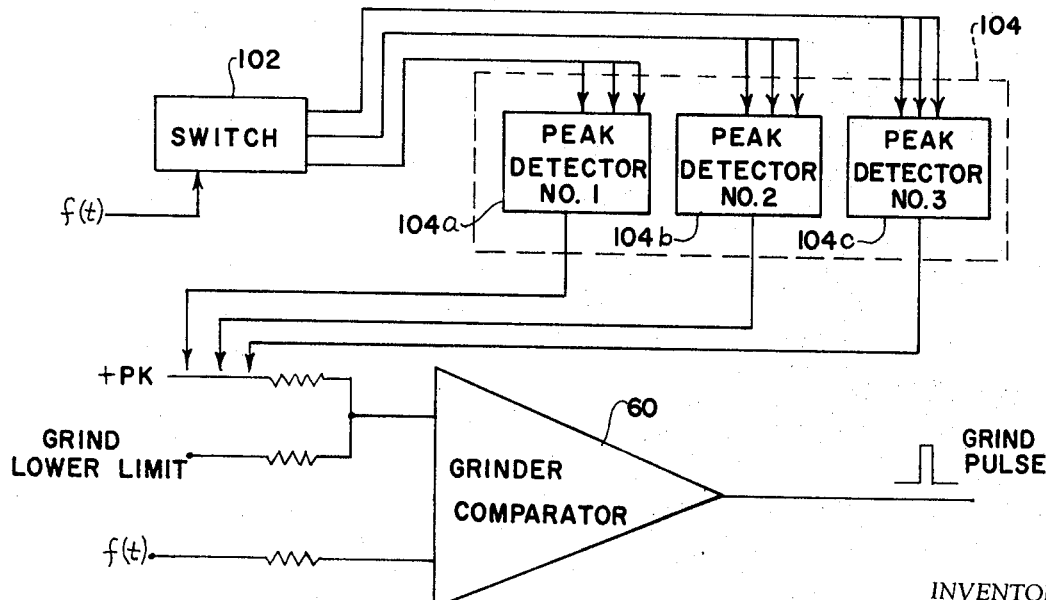
FIG. 6 is a block diagram of the peak detectors associated with the system of FIG. 3.

For a better understanding of the operation of switch 102 in combination with the peak detector 104, reference should be had to FIG. 6 of the drawings which shows that the peak detector 104 actually comprises three separate peak detectors indicated by numerals 104a through 104c, respectively. These separate detectors are each controlled by conventional timing and switch control mechanism within switch 102. Specifically, switch 102 provides three separate control signals on alternating cycles to each detector 104a through 104c. The first signal is to initialize the respective detector to compensate for any DC offset that may be superimposed upon the input $f(t)$ variable waveform. The next signal is to allow peak detection to determine the minimum or bottom peak value of the input waveform. Hence, for each rotation of the tire $f(t)$ is an input signal to switch 102, and is sent in preselected timing relationship to one of the three detectors. After completion of a test cycle, the peak detectors hold their maximum values and this hold signal is the third and final control by switch 102. Thus, switch 102 actually sequentially operates the peak detectors 104a through 104c so that, for example, while detector 104a is being initialized, detector 104b is computing or determining minimum bottom peak value of the input waveform $f(t)$ and peak detector 104c is storing and holding and sending its information as the present input to grinder comparator 60. With each of these cycles being predetermined at 1 second intervals they hence correspond to one full revolution of the tire which rotates at 60 r.p.m. However, the system is independent of tire rotational speed. At the present time, 60 r.p.m. is generally in use for tire testing. Hence, continuously updated information is being developed every rotational cycle of the tire to determine a new plus peak value for summation with the $f(t)$ input to the grinder comparator 60. The peak detectors are conventionally known circuits for analog computers, and a suitable circuit therefor is set out on Page 352 of the book. "Electronic Analog & Hybrid Computers," authored by Korn & Korn, and published by McGraw-Hill in 1964. With the $+pk$ signal combined with the preset lower grind limit signal a floating bottom limit is set for establishing the grind pulses. Effectively, all comparator 60 does is sum these signals so that all portions of the $f(t)$ signal which rise above the bottom limit create grind signals. There might be any number of grind pulses generated for each revolution of the tire.

CLOSED-LOOP SERVOSYSTEM

Figure 5:
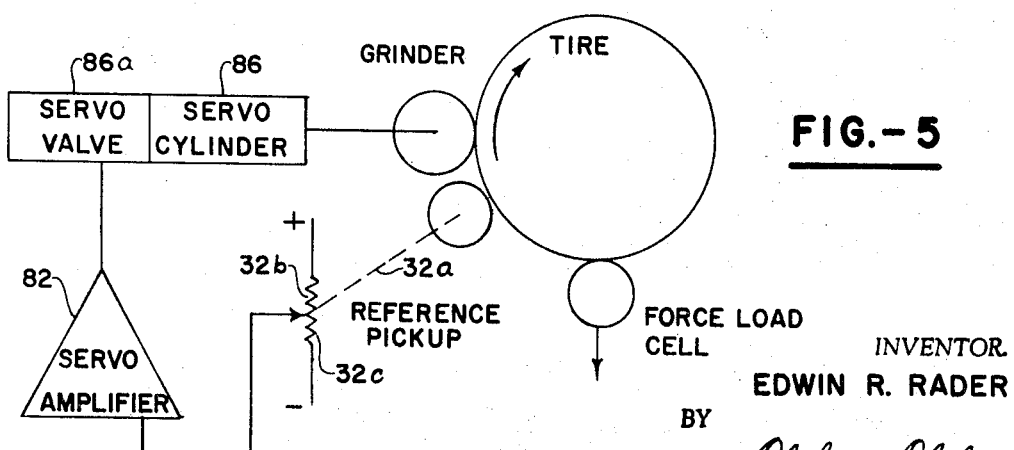
FIG. 5 is a schematic illustration of the closed-loop servosystem associated with the grinder heads of FIG. 3.

FIG. 5 more clearly illustrates the closed-loop servosystem operating through the reference pickup to control the servovalve and servocylinder so that the grinder wheel follows at a position of approximately 0.005 inch above the surface of the tire periphery. The grinder head deviation from this reference is under control of the force variation signals only, thus, tire correction is independent of the tire roundness. The process is a true force correction and operates under control of the force signals. The reference pickup is some kind of roller or shoe indicated by numeral 32 and is connected mechanically as indicated by dotted line 32a to a movable pickoff arm 32b of a variable resistor or transformer indicated by numeral 32c. Hence, the electrical signal from pickoff arm 32b driving into the servoamplifier 82 forms a closed-loop system through the servovalve 86a for control of the servo or hydraulic cylinder 86. It should be noted however, that it is possible to implement the concept without a direct reference pickup. For example, a spring mounted grinder would automatically reposition itself as the tire rotates relative thereto.

As has been indicated previously, the electronics package 22 determines the force correction signals to the grinder head servosystem by determining the signal $f(t)$ in relationship to a lowest peak value. The peak value is updated once per tire revolution to insure optimum accuracy even though the tire force variation signal is continuously being reduced.

Figure 4:
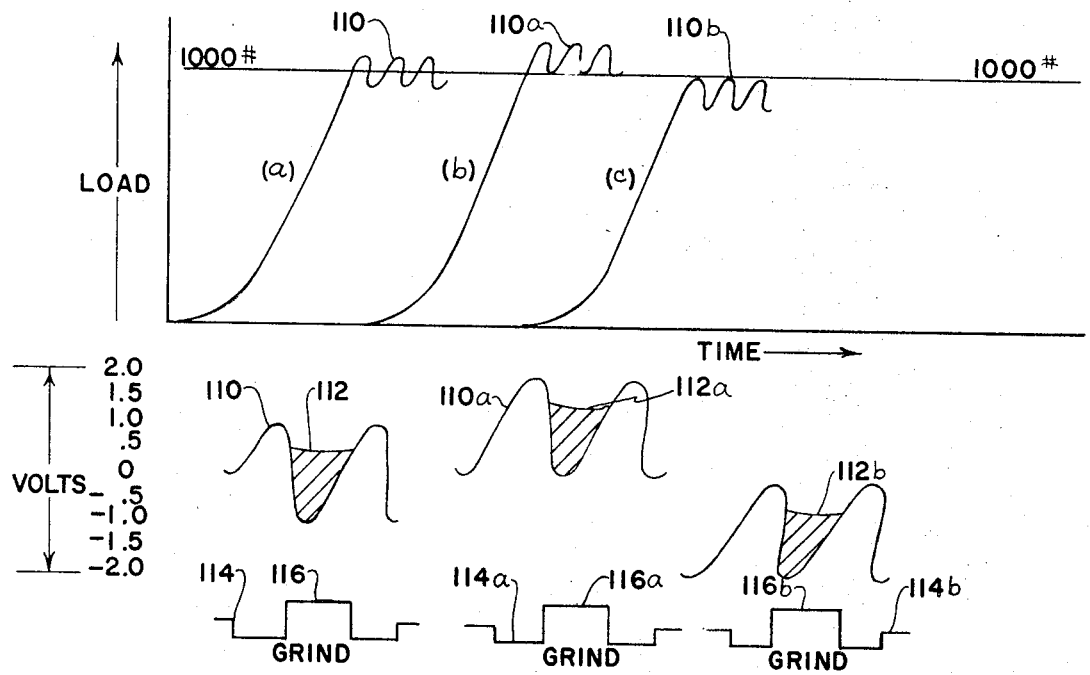
FIG. 4 is a graphic illustration of the loading characteristics of sample tires being acted upon by the system.

FIG. 4 of the drawings more clearly shows how the grind pulse is generated based on the $f(t)$ signal generated by the load cells. Specifically, the graph shows time in relationship to load for three separate conditions labeled a, b, and c. Preferably, the tire is loaded by the road wheel to approximately a 1,000-lb. level, this being the normal loading requirement for automobile passenger tires based on the average weight of the automobile upon which the tire will ride. Naturally, this load may vary for other tires being tested and corrected with the apparatus of the invention. However, a graph a illustrates a tire which, when loaded to the 1,000-lb. level has a radial force variation that oscillates around this 1,000-lb. level, with this portion of the signal being indicated generally by numeral 110 and being illustrated in greatly enlarged scale directly therebeneath showing that the signal actually varies from approximately a 0 potential to a 1.0-volt potential on the upswing and the −1.0 potential as the lowest peak where 0 potential is at 1000 lb. The apparatus of the invention grinds off that portion of the dip indicated by shaded area 112. In other words, the $+pk$ signal would be established at −1.0 volts, and the lower grind limit lb. signal at +0.5 volts. Hence, the peak above this bottom limit would be from −0.5 to +1.0 volts. The signal generated by the grinder comparator 60 is illustrated below the enlarged scale portion and is indicated by waveform 114. This produces a grind pulse 116 which effectively extends across the shaded portion 112 of the signal 110. In other words, the comparator 60 generates a signal having a width representing the voltage difference from a −1.0 level to approximately a +0.5 level or 1.5 volts in total. The grind pulse 116 does not vary in height or intensity as will be more fully defined hereinafter, but only in width. The pulse 116 automatically moves the grinder a predetermined distance toward the tire for a period of time equal to the pulse width.

Now looking towards graph b which produces an alternating pulsating signal 110a that levels out above the 1,000-lb. level, it is seen in the lower enlarged portion of the drawing that this signal 110a varies from 0 volts to 2.0 volts, and yet the shaded portion 112a again represents a 1.5-volts difference, and hence the grind signal 116a is of the same width as signal 116 in the case of the graph a. Similarly, with reference to graph c that produces a pulsating signal 110b that falls completely below the 1,000-lb. level, it is seen that the voltage varies from 0 to −2.0 volts and yet has a peak-to-valley relationship that also equals 1.5 volts, as indicated by shaded area 112b. Hence, the grind signal 116b is the same width as in the graphs a and b described above since the +pk signal will be −2.0 volts so that the bottom limit is established at −2.0+0.5=−1.5 volts.

In order to accurately determine when the tire reaches an acceptable force variation level, any convenient logic circuitry may be utilized such as a timer 160 which receives the output signal from grinder comparator 60 and is reset whenever a grind pulse is received. Whenever timer 160 goes for one tire revolution without receiving a grind pulse, it sends a signal to switch 102 to show completion of the tire grind cycle. Essentially, it has been found that grinding will take between about 10 to about 60 seconds, depending upon the severity of the radial force variations $f(t)$ present in the particular tire being corrected. Also, it should be noted that if the initial output signal from comparator 60 is of an acceptable magnitude, no grinding at all will take place.

It has also been found that since the ability of a grinder head to cut into a tire is greatly limited by practical considerations (such as grinder motor power, heat buildup, force feedback, etc.) it would be inefficient to produce an accurate proportional signal to control the grinder head for force variations in excess of those that can be practically utilized. For instance, if the maximum grind depth possible is 0.01 inch or approximately 10 lbs., proportional signals greater than 10 lbs. are useless since the physical operation of grinding saturates. An accurate proportional system, therefore, need only operate linearly over the range of 0 to 9 or 10 lbs. to produce system accuracy results that are exactly comparable to systems costing many times as much. Hence, the signal out of the grinder comparator 60 is corrected in the digital filter 80 to provide a grind signal set for the system parameters, and for most passenger tire usages will be a signal to produce an 8- to 10-lb. grind force against the tire, which normally grinds to a depth of between 0.008 to 0.010 inch. It has also been found that to achieve a proportional scaling when the force variation signal $f(t)$ equals a lower grind limit, probably preselected at around 12 lbs., the grind signal should be decreased to about half the value previously set to provide the finishing off grinding touches to achieve optimum performance of the system. This type of fine control is provided by a scaling comparator 60a which compares $f(t)$ with a voltage picked off a scaling change resistor 61 and passed to comparator 60a over line 63. The voltage is indicated at a preselected limit of 12 p.s.i. The output of comparator 60a controls a pair of switches 65 and 67 connecting a part of the output of digital filter 80 to the servoamplifiers 82 and 84, respectively. In effect switches 65 and 67 are always closed thereby providing maximum signal input to the amplifiers 82 and 84. However, when comparator 60a has an output indicating the force variation has reduced to 12 p.s.i. or less the signal will open switches 65 and 67 so as to substantially halt the signal from the filter 80 to the amplifiers 82 and 84. Thus, scaling is accomplished with a reliable, but inexpensive system.

The switch 102 will also contain a timing mechanism so that a maximum grind time is set. Hence, if an excessive amount of time is required to grind the tire to the desired limit, it will be rejected at the end of this preselected time.

It is also possible to incorporate into the basic system some maximum limit detection so that if the $f(t)$ signal is above a point at which correction could not reasonably be expected even with grinding, then no grinding will take place at all. This maximum detection is a preselected value 164 picked off a variable resistor 166 and compared in a reject comparator 168 with $f(t)$. If $f(t)$ is greater than the value 164, then a reject signal will be sent immediately to switch 102. The upper limit set by valve 164 will represent between 50 p.s.i. to about 80 p.s.i.

The invention may also incorporate into the digital filter 80 circuitry logic understood by those skilled in the art to eliminate drive signals beyond the mechanical response characteristics of the servoamplifying system in combination with the hydraulic cylinders which result in the on and off signals bucking one another and causing the grinder head to be in an undefined position. This logic eliminates grind pulses that are narrower in width than some predetermined millisecond range. This type of pulse elimination in combination with pulse stretching of those signals at about the middle of an irregular radial force pulsation will produce grind signals of the type illustrated in FIG. 4 of the drawings so as to provide a smooth and coordinated operation of the servosystem. This will allow very narrow midrange pulses to be reduced at the expense of adding a valley immediately following the peak, but it has been found that this makes the system function more reliably, and eliminates strain on the mechanical components. Pulse stretching, masking, and elimination are well known in the art.

Thus, it should be understood that the tire uniformity correction system performs the following functions through use of state-of-the-art computer technology and components:

1. Accurately and continuously computes the angular position of the tire through the code wheel 74.

2. Converts the analog tire force variation signal $f(t)$ into digital form and delays this information by shift register 72 to relate the grind pulse to its angular position on the tire periphery.

3. Establishes a servocontrol floating reference for the grinder head by the mechanism shown in FIG. 5 of the drawings, such that tire roundness deviations are eliminated from force correction calculations.

4. Accurately converts the peak detector signal by grinder comparator 60 to produce a grind pulse 68 that controls the grinder head for a computed time interval to remove force variations.

5. Establishes the minimum radial force to which tire shall be corrected of tire correction by potentiometer 66 as the bottom force reference.

6. Reduces the tire radial force variation to a preselected value and signals completion through the bump timer 160.

7. Rejects the tire when the radial force variation is greater than the upper radial limits set which is provided by input 164 to the reject comparator 168. Also, tire rejection takes place if the grind limit is not reached within a preselected time by an electronic timer incorporated into switch 102.

While in accordance with the patent statues only one best known embodiment of the invention has been illustrated and described in detail, it is to be particularly understood that the invention is not limited thereto or thereby, but that the inventive scope is defined in the appended claims.

I claim:

1. A tire uniformity correction apparatus which includes means to rotatably support an inflated tire having a tread with lateral edge shoulders, means to radially load the tire tread and produce loaded rotation thereof, means to detect radial force variations in the tire tread occurring during the loaded rotation thereof which includes at least two load cells mounted to the means to radially load the tire tread, which detect radial load variations at least on both lateral edge shoulders of the tread, and produce electrical signals of said radial load variations, means to amplify the electrical signals produced by the load cells to produce amplified signals, means to sum the amplified signals with a preset load signal to produce a force variation signal around the preset load signal, means to determine peak in the force variation signal for each revolution of the tire and sum this peak with a preselected minimum grind signal to produce a bottom grind limit signal for each revolution of the tire, means to sum the force variation signal with the bottom grind limit signal to produce a grind signal for time equal to the duration of that portion of the force variation signal exceeding the bottom grind limit signal, grinder means positioned adjacent the tread of the tire, and means to actuate the grinder means to move the grinder means into the tread to grind portions from only the lateral shoulders in accordance with the grind signals as the tire rotates.

2. A tire uniformity correction apparatus according to claim 1 including means to shift the grind signals in accordance with the position of the load cells relative to the tire and the grinder means so that grinding takes place at the proper position on the tire, and where the grinder means comprises a pair of grinding wheels each positioned to engage only a respective lateral edge shoulder of the tire.

3. A tire uniformity correction apparatus according to claim 2 where the means to shift the grind signals includes a code wheel mechanically connected to the tire to determine its instantaneous angular position, and a register to effect timing delay of the grind signal so that it occurs in exact registration when the tire is in the proper position under the grinder means.

4. A tire uniformity correction apparatus according to claim 3 where the means to actuate the grinder means is a hydraulic servosystem, and which further includes a closed loop servo means to position each respective grinding wheel at a preselected uniform distance from its respective lateral edge shoulder of the tire tread at all times during the rotation thereof exclusive of grind signals.

5. A tire uniformity correction apparatus according to claim 4 which includes a digital filter to provide signal conversion to drive the servosystem at a predetermined maximum limit, to provide pulse suppression and extension to eliminate mechanical strain on the servosystem due to irregular and short force variations, and a reject comparator to provide a means to detect an excessive signal and indicate the presence thereof, and reject the tire.

6. A tire uniformity correction apparatus according to claim 5 which includes three separate minimum peak detector means, and timing and switch control means sequentially actuating each detector means in respective cycles initializing, measuring the minimum peak, and storing the measured peak information, and a scaling comparator dependent upon the peak information to reduce the maximum value of the drive signal to the servosystem as the peak information decreases in value.

7. A tire uniformity correction apparatus according to claim 6 which includes means to limit the total time of grinding to a predetermined value, where maximum grind pressure is 10 lbs., and where each grinding wheel acts independently with its own servosystem.

8. A tire uniformity correction apparatus which includes means to rotate an inflated pneumatic tire having a tread about its rotational axis, means to load the tire to effect rotation of the tire under loaded conditions, means to measure radial force variations in the tire relative to its rotational axis while it is rotating under loaded conditions and produce signals thereof, means to grind material off only the lateral edges of the tread of the tire while it is rotating under loaded conditions to correct such radial force variations to predetermined minimum acceptance levels, means to provide a closed loop continuous measurement of such radial force variations, and means to control the means to grind so they are actuated with a predetermined force, but of a timed duration directly dependent upon the force variations.